United States Patent
Watanabe et al.

(10) Patent No.: US 10,697,782 B2
(45) Date of Patent: Jun. 30, 2020

(54) MAP INFORMATION UPDATE SYSTEM AND MAP INFORMATION UPDATE SERVER

(71) Applicant: TOYOTA JIDOSHA KABUSHIKI KAISHA, Toyota-shi, Aichi-ken (JP)

(72) Inventors: Junya Watanabe, Shizuoka-ken (JP); Hideyuki Matsui, Shizuoka-ken (JP); Norihiro Takahashi, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 194 days.

(21) Appl. No.: 15/904,794

(22) Filed: Feb. 26, 2018

(65) Prior Publication Data
US 2018/0245929 A1    Aug. 30, 2018

(30) Foreign Application Priority Data

Feb. 27, 2017   (JP) ................................ 2017-035046

(51) Int. Cl.
| | |
|---|---|
| G01C 21/32 | (2006.01) |
| G06F 16/29 | (2019.01) |
| H04W 4/44 | (2018.01) |
| H04W 4/40 | (2018.01) |
| G06Q 30/02 | (2012.01) |
| H04W 4/38 | (2018.01) |

(Continued)

(52) U.S. Cl.
CPC ............. *G01C 21/32* (2013.01); *G06F 16/29* (2019.01); *G06Q 30/0231* (2013.01); *H04W 4/40* (2018.02); *H04W 4/44* (2018.02); *G01C 21/20* (2013.01); *G01C 21/3614* (2013.01); *H04W 4/38* (2018.02)

(58) Field of Classification Search
CPC .... G01C 21/32; G01C 21/3614; G01C 21/20; H04W 4/44; H04W 4/40; H04W 4/38; G06F 16/29; G06Q 30/0231
USPC ......................................................... 701/450
See application file for complete search history.

(56) References Cited

U.S. PATENT DOCUMENTS

| | | | | |
|---|---|---|---|---|
| 8,527,199 B1 * | 9/2013 | Burnette | .............. | G08G 1/0112 |
| | | | | 701/450 |
| 2003/0216880 A1 * | 11/2003 | Endoh | ................... | G01C 21/26 |
| | | | | 702/122 |

FOREIGN PATENT DOCUMENTS

| | | | |
|---|---|---|---|
| CN | 104539667 | * | 4/2015 |
| JP | 2002-132909 A | | 5/2002 |

(Continued)

*Primary Examiner* — Muhammad Shafi
(74) *Attorney, Agent, or Firm* — Sughrue Mion, PLLC

(57) ABSTRACT

A map information update system includes a map database; a server; a vehicle position recognition unit configured to recognizes a vehicle position of a vehicle on a map; an external environment information generation unit configured to generate external environment information related to an external environment of the vehicle in association with the vehicle position on the map based on the vehicle position on the map and a detection result of a sensor mounted on the vehicle; a map freshness calculation unit configured to calculate map freshness per area set in advance on map information; a awarding unit configured to award a user of the vehicle or the vehicle an incentive point which is set in advance in accordance with the map freshness of the area corresponding to the external environment information, when the external environment information is transmitted to the server from the vehicle; and a user interaction unit.

8 Claims, 6 Drawing Sheets

(51) Int. Cl.
*G01C 21/20* (2006.01)
*G01C 21/36* (2006.01)

(56) References Cited

FOREIGN PATENT DOCUMENTS

| | | |
|---|---|---|
| JP | 2003-279358 A | 10/2003 |
| JP | 2003-331390 A | 11/2003 |
| JP | 2005-157410 A | 6/2005 |
| JP | 2005-241715 A | 9/2005 |
| JP | 2013-534662 A | 9/2013 |
| JP | 2016-180797 A | 10/2016 |
| JP | 2018-025865 A | 2/2018 |
| WO | 2011/159487 A2 | 12/2011 |

\* cited by examiner

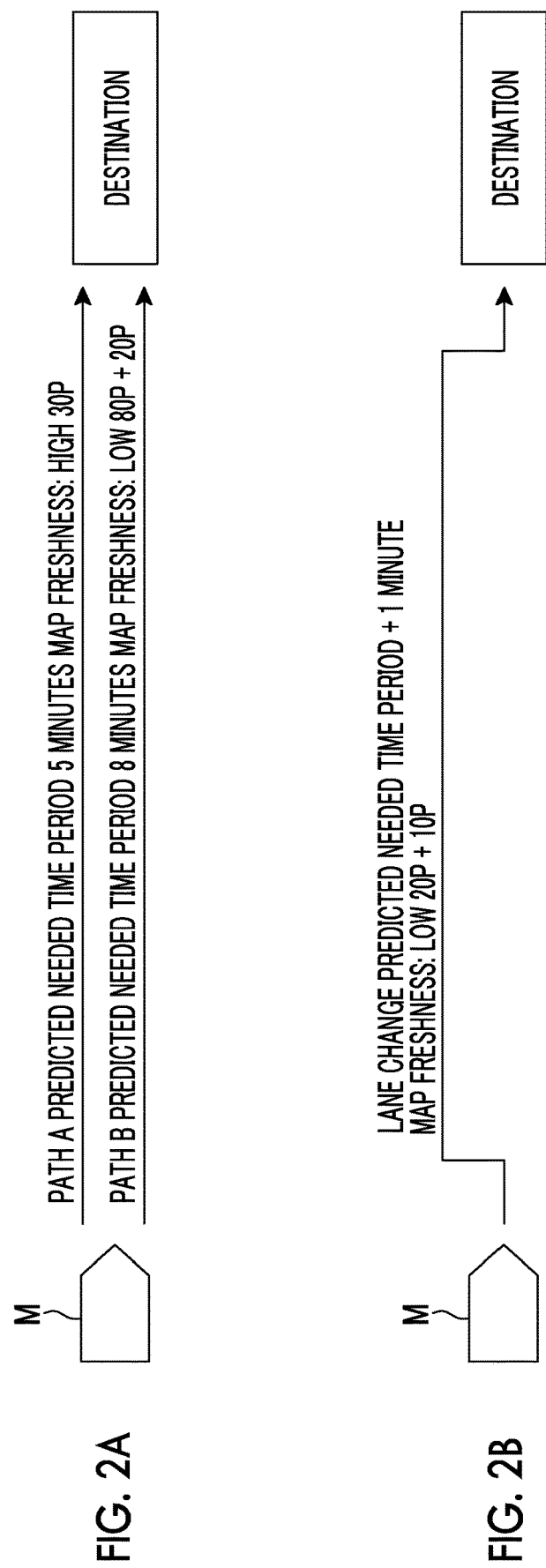

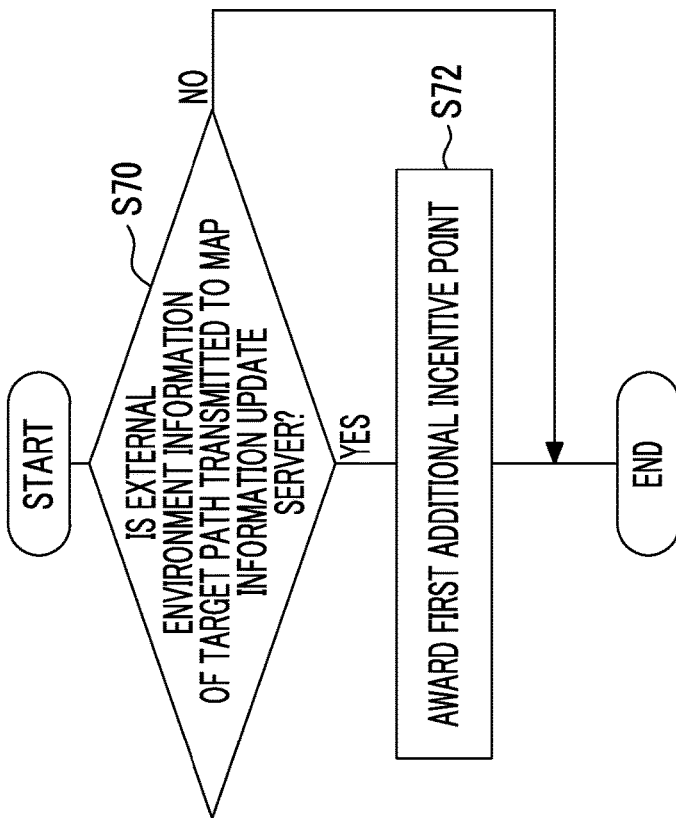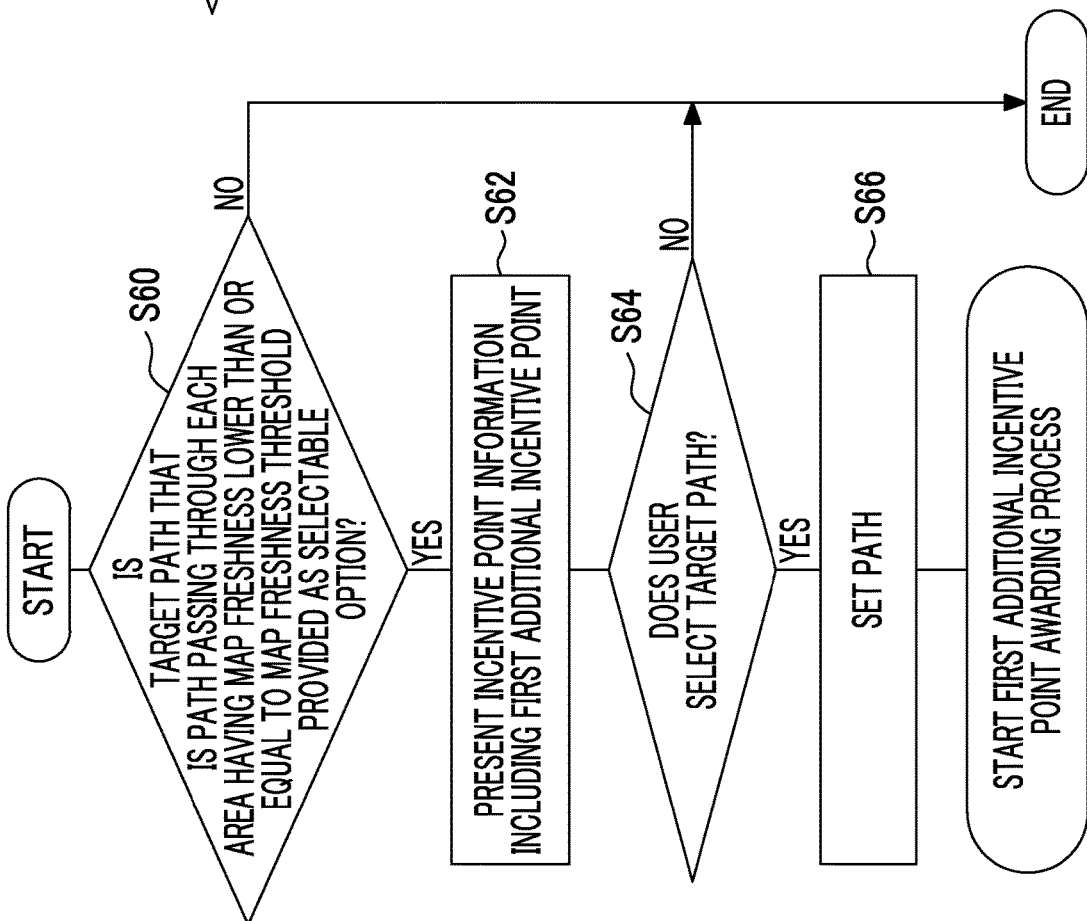

MAP INFORMATION UPDATE SYSTEM AND MAP INFORMATION UPDATE SERVER

INCORPORATION BY REFERENCE

The disclosure of Japanese Patent Application No. 2017-035046 filed on Feb. 27, 2017 including the specification, drawings and abstract is incorporated herein by reference in its entirety.

BACKGROUND

1. Technical Field

The present disclosure relates to a map information update system and a map information update server.

2. Description of Related Art

In the related art, Japanese Unexamined Patent Application Publication No. 2016-180797 (JP 2016-180797 A) is known as a technical document related to a map information update system. A device disclosed in JP 2016-180797 A is a road information generation device that generates a road map from traveling data of a vehicle. The device includes a storage unit that stores a plurality of pieces of traveling data of the vehicle, and a road information generation unit that generates road information from a set of road position information and the corresponding traveling data.

A program disclosed in Japanese Unexamined Patent Application Publication No. 2003-331390 (JP 2003-331390 A) is an information provision program that provides sensor information of a vehicle-mounted sensor to an external system when permitted by a driver. The program notifies the driver of a point in accordance with the reliability of the sensor information.

SUMMARY

Communication cost is incurred when data is transmitted from a vehicle to a server where map information is updated. Thus, it is desirable to award an incentive to a user of the vehicle to transmit data. However, in the information provision program in JP 2003-331390 A, high points are awarded for high reliability of sensor information even when the sensor information is not needed for updating the map information. Thus, there is room for improvement.

In the present technical field, it is desirable to provide a map information update system and a map information update server that can appropriately award an incentive point (score) for transmitting information to the map information update server from a vehicle.

A first aspect of the present disclosure relates to a map information update system. The map information update system includes a map database configured to store map information; a map information update server configured to update the map information based on external environment information which is acquired by communicating with a vehicle; a vehicle position recognition unit configured to recognize a position of the vehicle on a map; an external environment information generation unit configured to generate the external environment information related to an external environment of the vehicle in association with the position of the vehicle on the map based on the position of the vehicle on the map and a detection result of an external sensor which is mounted in the vehicle; a map freshness calculation unit configured to calculate map freshness per area which is set in advance on the map information; an incentive point awarding unit configured to award a user of the vehicle or the vehicle an incentive point which is set in advance in accordance with the map freshness of the area corresponding to the external environment information, when the external environment information is transmitted to the map information update server from the vehicle; and a user interaction unit configured to present map freshness information related to the map freshness of the area or incentive point information related to the incentive point of the area to the user.

According to the first aspect of the present disclosure, by transmitting the external environment information to the map information update server from the vehicle, the user of the vehicle or the vehicle is awarded the incentive point that is set in advance in accordance with the map freshness calculated per area corresponding to the external environment information. Accordingly, according to the first aspect of the present disclosure, the incentive point can be appropriately awarded for transmitting information to the map information update server from the vehicle. According to the first aspect of the present disclosure, the convenience of use for the user can be improved by presenting the map freshness information related to the map freshness of the area or the incentive point information related to the incentive point of the area to the user.

In the map information update system according to the first aspect of the present disclosure, the user interaction unit may ask the user whether or not to transmit the external environment information to the map information update server, and control the external environment information to be transmitted to the map information update server when the user responds to transmit the external environment information to the map information update server. According to the first aspect of the present disclosure, the user is asked whether or not to transmit the external environment information to the map information update server from the vehicle. When the user responds to transmit the external environment information to the map information update server, the external environment information is transmitted to the map information update server. Thus, the convenience of use for the user can be improved.

The map information update system according to the first aspect of the present disclosure may further include a path selection unit configured to cause the user to select the path when a plurality of paths to be traveled by the vehicle is present. The user interaction unit may present the map freshness information in the paths or the incentive point information in the paths to the user at a time of path selection by the user. According to the first aspect of the present disclosure, the map freshness information or the incentive point information in the paths is presented to the user at the time of path selection. Thus, the user can be motivated to select the path from which the user wants to acquire the external environment information from the viewpoint of updating the map information.

In the map information update system according to the first aspect of the present disclosure, when a target path that passes through the area having the map freshness lower than or equal to a map freshness threshold is included in the paths at the time of path selection by the user, the user interaction unit may inform the user that a first additional incentive point is awarded by transmitting the external environment information acquired by the vehicle traveling along the target path to the map information update server. The incentive point awarding unit may award the user or the vehicle the first additional incentive point when the external environment information of the target path acquired by the vehicle traveling along the target path selected by the user is transmitted to the map information update server. According to the first aspect of the present disclosure, awarding the first additional incentive point can motivate the user to select the target path that passes through the area having the map freshness lower than or equal to the map freshness threshold. Thus, it is advantageous for both the user and a system operator to transmit the external environment information of the area having the map freshness lower than or equal to the map freshness threshold to the map information update server.

In the map information update system according to the first aspect of the present disclosure, when the map freshness of the area through which an adjacent lane that is adjacent to a traveling lane traveled by the vehicle passes is lower than the map freshness of the area through which the traveling lane passes, the user interaction unit may inform the user that a second additional incentive point is awarded by transmitting the external environment information acquired by the vehicle traveling on the adjacent lane to the map information update server. The incentive point awarding unit may award the user or the vehicle the second additional incentive point when the external environment information of the adjacent lane acquired by the vehicle changing the lane is transmitted to the map information update server. According to the first aspect of the present disclosure, awarding the second additional incentive point can motivate the user to change the lane to the adjacent lane that passes through the area having low map freshness. Thus, it is advantageous for both the user and the system operator to transmit the external environment information of the area having low map freshness to the map information update server.

In the map information update system according to the first aspect of the present disclosure, when the user sets automatic transmission to automatically transmit the external environment information of the vehicle to the map information update server, the user interaction unit may automatically transmit the external environment information generated by the external environment information generation unit to the map information update server. According to the first aspect of the present disclosure, the user does not need to respond each time for transmission of the external environment information, and the convenience of use for the user can be improved.

In the map information update system according to the first aspect of the present disclosure, the user interaction unit may inform the user that a third additional incentive point is awarded when the external environment information is automatically transmitted to the map information update server by setting the automatic transmission. The incentive point awarding unit may award the user or the vehicle the third additional incentive point when the external environment information is automatically transmitted to the map information update server by setting the automatic transmission. According to the first aspect of the present disclosure, awarding the third additional incentive point can motivate the user to set the automatic transmission of the external environment information of the vehicle, and the map information update server can stably acquire the external environment information. Thus, it is advantageous for both the user and the system operator.

In the map information update system according to the first aspect of the present disclosure, the map information update server may include a reliability evaluation unit that evaluates reliability of the external environment information. The map information update server may update the map information using the external environment information that has the reliability higher than or equal to a reliability threshold. According to the first aspect of the present disclosure, the map information is updated using the external environment information having high reliability. Thus, a decrease in the accuracy of the map information can be suppressed.

A second aspect of the present disclosure relates to a map information update server. The map information update server includes a first database configured to store map information, a second database configured to store an association between a score and a user of a communicating vehicle or the vehicle, and a control circuit. The control circuit is configured to control calculation of the score based on the map information and first information related to a position of the vehicle acquired by communicating with the vehicle, transmission of the score to the vehicle, updating of the map information based on second information that is transmitted from the vehicle after the score is transmitted to the vehicle, and updating of the score for the user or the vehicle when the map information is updated based on the second information.

As described heretofore, according to the first and second aspects of the present disclosure, the incentive point can be appropriately awarded for transmitting information to the map information update server from the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2A is a diagram illustrating one example of information that is presented to a user at the time of path selection;

FIG. 2B is a diagram illustrating one example of information that is presented to the user at the time of suggesting a lane change;

FIG. 5A is a flowchart illustrating a target path selection process;

FIG. 5B is a flowchart illustrating a first additional incentive point awarding process;

DETAILED DESCRIPTION OF EMBODIMENTS

Hereinafter, an embodiment of the present disclosure will be described with reference to the drawings.

Figure 1:
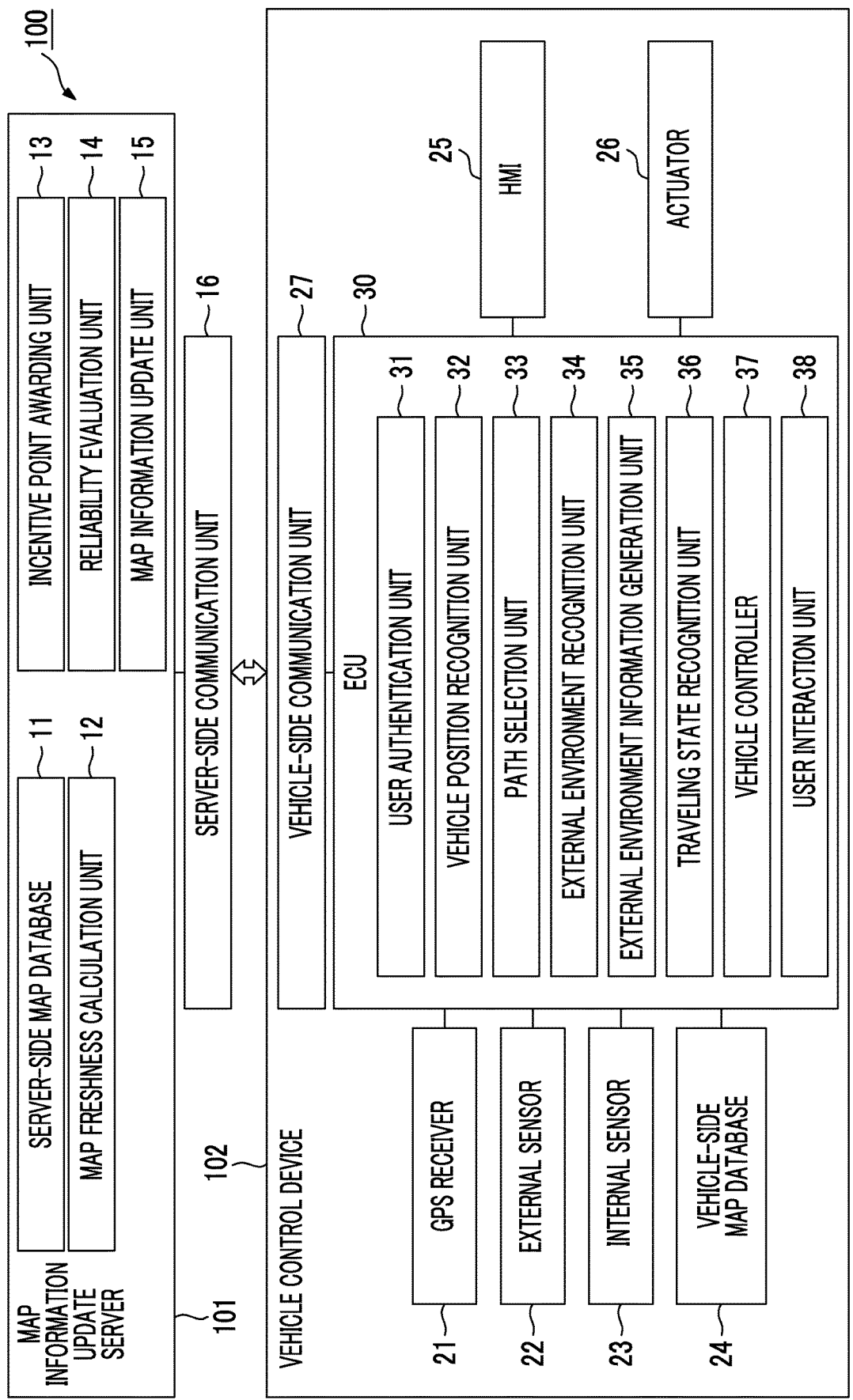
FIG. 1 is a block diagram illustrating a map information update system according to the present embodiment.

FIG. 1 is a block diagram illustrating a map information update system according to the present embodiment. A map information update system 100 illustrated in FIG. 1 is a system that updates map information using information acquired from a vehicle.

Configuration of Map Information Update System

As illustrated in FIG. 1, the map information update system 100 includes a map information update server 101 and a vehicle control device 102.

Configuration of Map Information Update Server

The map information update server 101 is a server that is disposed in a facility such as a center where information related to traffic is managed. The map information update server 101 updates the map information based on external environment information acquired from a vehicle that can communicate with the map information update server 101. The external environment information is information related to the external environment of the vehicle (includes a road environment such as a white line on the road) that is detected with an external sensor of the vehicle. Details of the external environment information will be described below.

The map information update server 101 is configured as a general computer including a CPU, a storage unit, and a communication controller. The storage unit may be a ROM and/or a RAM, or may be a storage medium such as an HDD having a redundant arrays of inexpensive disks (RAID) configuration. The storage unit may be disposed outside the map information update server 101. The communication controller is a communication device such as a network card that controls communication. Each function of the map information update server 101 is realized by a set of operations of each hardware unit. The map information update server 101 may be configured with a plurality of computers. The map information update server 101 may be a cloud server.

The map information update server 101 includes a server-side map database 11, a map freshness calculation unit 12, an incentive point awarding unit 13, a reliability evaluation unit 14, and a map information update unit 15. The map information update server 101 is connected to a server-side communication unit 16 that communicates with the vehicle. For example, the server-side communication unit 16 is a communication facility in the center where the map information update server 101 is disposed.

The server-side map database 11 is a database that stores the map information. The map information includes road position information, road shape information (for example, types of curves and linear parts, and the curvature of each curve), intersection and branch position information, structure position information, and the like. The server-side map database 11 is a reference for a vehicle-side map database 24 described below. Updating the map information in the server-side map database 11 will be described below.

The server-side map database 11 stores area information that is related to areas set in advance on the map. For example, each area is formed by dividing the map in a grid shape. The manner of forming the areas is not particularly limited. Each area may be a section that is set along the road. The server-side map database 11 may be disposed in a server that is different from the map information update server 101.

The map freshness calculation unit 12 calculates map freshness per area that is set on the map information in the server-side map database 11. The map freshness is the degree of freshness of the map information. The map freshness calculation unit 12 calculates the map freshness in accordance with an elapsed time period from the update of the map information in each area. For example, the map freshness calculation unit 12 calculates a higher value of the map freshness as the elapsed time period from the update of the map information in each area is shorter. The map freshness calculation unit 12 does not need to calculate the map freshness as a numerical value. The map freshness calculation unit 12 may acquire the map freshness as a stepwise state such as high, medium, and low.

The incentive point awarding unit 13 awards an incentive point to the vehicle or a user of the vehicle when the external environment information is transmitted to the map information update server 101 from the vehicle controlled by the vehicle control device 102. Specifically, for example, the incentive point awarding unit 13 may include a database that associates the vehicle or the user of the vehicle with the incentive point (score). In the present embodiment, the user of the vehicle may be a person in the vehicle. For example, the user of the vehicle refers to a person who uses the vehicle. For example, the target of awarding the incentive point is one user. The user does not need to be a driver and may be a passenger. The user who is the target of awarding the incentive point may be an owner (includes a corporation) of the vehicle who is not in the vehicle.

The incentive point is a point for motivating the user of the vehicle to transmit the external environment information to the map information update server 101. For example, the incentive point may be a mile in Mileage (registered trademark) of an airline company, a point in a well-known point system, or an exclusive point. The incentive point may be a point that provides advantages to the user by accumulating the incentive point. The incentive point can be a point that can be used for paying a fee for using a toll road, paying the cost of inspecting the vehicle, and paying the cost of examining the vehicle, or can be exchanged with fuel, exchanged with merchandise items, or converted into electronic money.

The incentive point awarding unit 13 determines the incentive point in accordance with the map freshness of the area corresponding to the external environment information. The incentive point awarding unit 13 may determine the incentive point using map data that associates the map freshness with the incentive point. The area that corresponds to the external environment information is an area that includes a position where the external environment information is acquired on the map.

The incentive point awarding unit 13 awards the user or the vehicle the incentive point corresponding to the map freshness of the area when, for example, the amount of external environment information included in the area becomes greater than or equal to a certain amount (for example, when the external environment information that is acquired by the vehicle traveling a certain or longer distance in the area is transmitted to the map information update server 101).

The incentive point awarding unit 13 awards more incentive points for higher map freshness of the area corresponding to the external environment information. When the map freshness is higher than or equal to a predetermined threshold, the incentive point awarding unit 13 may award more incentive points than when the map freshness is lower than the predetermined threshold.

The incentive point awarding unit 13 awards an additional incentive point when the external environment information satisfying a predetermined condition is transmitted to the map information update server 101. The additional incentive point is a point that is additionally awarded to the user or the vehicle independently of the incentive point corresponding to the map freshness. The additional incentive point can have a value that is set in advance (for example, a fixed value). Types of additional incentive points include a first additional incentive point, a second additional incentive point, and a third additional incentive point. Details of each additional incentive point will be described below.

The reliability evaluation unit 14 evaluates the reliability of the external environment information. The reliability of the external environment information is the reliability of the vehicle control device 102 that is included in the external environment information and is acquired at the time of detecting the external environment of the vehicle. When, for example, information of the white line on the road is not included in the external environment information due to a preceding vehicle or the like covering the white line in the detection range of the external sensor at the time of detecting the external environment of the vehicle, the reliability evaluation unit 14 evaluates the reliability of the external environment information as a lower value than when information of the white line is included in the external environment information. The reliability evaluation unit 14 may evaluate the reliability as a lower value as the proportion of the white line covered by another vehicle or the like in the external environment information is higher. The proportion of the covered white line can be acquired using a well-known technology (for example, an image processing technology for cameras).

The reliability evaluation unit 14 may evaluate the reliability of the external environment information based on the reliability of the external sensor at the time of detecting the external environment of the vehicle. Similarly, the reliability evaluation unit 14 may evaluate the reliability of the external environment information based on the reliability (stability) of an ECU of the vehicle control device 102. The reliability of the external sensor and the reliability of the ECU can be acquired using a well-known technology. In such a case, the reliability evaluation unit 14 acquires the reliability of the external sensor and/or the reliability of the ECU at the time of detecting the external environment of the vehicle by communicating with the vehicle.

The map information update unit 15 updates the map information in the server-side map database 11 based on the external environment information acquired from the vehicle. First, the map information update unit 15 determines whether or not the reliability of the external environment information evaluated by the reliability evaluation unit 14 is higher than or equal to a reliability threshold. The reliability threshold is a threshold that is set in advance. The map information update unit 15 updates the map information based on the external environment information having reliability higher than or equal to the reliability threshold. The map information update unit 15 updates the map information using the external environment information that has the reliability higher than or equal to a reliability threshold.

The map information update unit 15 updates the map information based on the external environment information using a well-known technology. For example, the map information update unit 15 updates the map information by generating a continuous road surface image from captured images of a camera included in the external environment information, and merging the generated road surface image on the map under a certain condition.

Configuration of Vehicle Control Device

A configuration of the vehicle control device 102 of the map information update system 100 will be described. The vehicle control device 102 is a device that controls the vehicle which can communicate with the map information update server 101. Control of the vehicle includes control of at least a human machine interface (HMI) 25 described below. Control of the vehicle may include control of traveling of the vehicle (for example, autonomous driving control and driving assistance control).

The vehicle control device 102 includes an electronic control unit (ECU) 30 that manages the overall vehicle control device 102. The ECU 30 is an electronic control unit that includes a central processing unit (CPU), a read-only memory (ROM), a random access memory (RAM), a controller area network (CAN) communication circuit, and the like. For example, in the ECU 30, various functions are realized by loading a program stored in the ROM into the RAM and executing the program loaded in the RAM using the CPU. The ECU 30 may be configured with a plurality of electronic units.

The ECU 30 is connected to a GPS receiver 21, an external sensor 22, an internal sensor 23, the vehicle-side map database 24, the HMI 25, an actuator 26, and a vehicle-side communication unit 27.

The GPS receiver 21 measures the position of the vehicle (for example, the latitude and the longitude of the vehicle) by receiving signals from three or more GPS satellites. The GPS receiver 21 transmits the measured position information of the vehicle to the ECU 30.

The external sensor 22 is a detector that detects a situation around the vehicle. The external sensor 22 includes at least one of a camera and a radar sensor.

The camera is a capturing device that captures the external environment of the vehicle. The camera is disposed behind a windshield of the vehicle. The camera transmits the captured information related to the external environment of the vehicle to the ECU 30. The camera may be a monocular camera or a stereo camera. The stereo camera includes two capturing units that are disposed to reproduce binocular disparity. The captured information of the stereo camera includes depthwise information.

The radar sensor is a detector that detects an obstacle around the vehicle using an electric wave (for example, a millimeter wave) or light. For example, the radar sensor is a millimeter wave radar or uses light detection and ranging (LIDAR). The radar sensor detects an obstacle by transmitting an electric wave or light to the surrounding area of the vehicle and receiving an electric wave or light reflected by an obstacle. The radar sensor transmits the detected obstacle information to the ECU 30. Types of obstacles include a fixed obstacle such as a guardrail and a building, and a moving obstacle such as a pedestrian, a bicycle, and another vehicle.

The internal sensor 23 is a detector that detects the traveling state of the vehicle. The internal sensor 23 includes a vehicle speed sensor, an acceleration sensor, and a yaw rate sensor. The vehicle speed sensor is a detector that detects the speed of the vehicle. For example, a wheel speed sensor that is disposed at a wheel or a driveshaft or the like of the vehicle rotating with the wheel as a single body and detects the rotation speed of the wheel is used as the vehicle speed sensor. The vehicle speed sensor transmits the detected vehicle speed information (wheel speed information) to the ECU 30.

The acceleration sensor is a detector that detects the acceleration of the vehicle. For example, the acceleration sensor includes a forward and rearward acceleration sensor that detects the forward and rearward acceleration of the vehicle, and a lateral acceleration sensor that detects the lateral acceleration of the vehicle. For example, the acceleration sensor transmits the acceleration information of the vehicle to the ECU 30. The yaw rate sensor is a detector that detects the yaw rate (rotational angular velocity) of the vehicle about the vertical axis at the center of gravity of the vehicle. For example, a gyrosensor can be used as the yaw rate sensor. The yaw rate sensor transmits the detected yaw rate information of the vehicle to the ECU 30.

The vehicle-side map database 24 is a database that stores map information. For example, the vehicle-side map database 24 is formed in a hard disk drive (HDD) that is mounted in the vehicle. The vehicle-side map database 24 communicates with the map information update server 101 and updates the map information by referencing the server-side map database 11. The vehicle control device 102 may not include the vehicle-side map database 24 and may be configured to acquire needed map information from the server-side map database 11.

The HMI 25 is an interface for output and input of information between the driver and the vehicle control device 102. For example, the HMI 25 includes a display that displays image information to the driver or the like, and a touch panel where the driver performs an input operation. The HMI 25 is connected to a speaker of the vehicle. The HMI 25 displays image information on the display and outputs audio from the speaker based on a control signal from the ECU 30. The HMI 25 may include a microphone for acquiring the voice of the user and have a voice recognition function for recognizing the voice of the user acquired with the microphone.

The actuator 26 is a device that is used in control of the vehicle. The actuator 26 includes at least a throttle actuator, a brake actuator, and a steering actuator. The throttle actuator controls the drive power of the vehicle by controlling the amount of air supplied to an engine (throttle opening degree) in accordance with a control signal from the ECU 30. When the vehicle is a hybrid vehicle, the drive power of the vehicle is controlled by inputting a control signal into a motor as a drive source from the ECU 30 in addition to control of the amount of air supplied to the engine. When the vehicle is an electric vehicle, the drive power of the vehicle is controlled by inputting a control signal into a motor as a drive source from the ECU 30. The motor as a drive source in such cases constitutes the actuator 26.

The brake actuator controls braking power applied to the wheel of the vehicle by controlling a brake system in accordance with a control signal from the ECU 30. For example, a hydraulic brake system can be used as the brake system. The steering actuator controls an assist motor of an electric power steering system to be driven in accordance with a control signal from the ECU 30. The assist motor controls steering torque. Accordingly, the steering actuator controls the steering torque of the vehicle.

The vehicle-side communication unit 27 is a device for communication with the map information update server 101. The vehicle control device 102 transmits and receives various types of information with the map information update server 101 through the vehicle-side communication unit 27. The form of communication is not particularly limited.

A functional configuration of the ECU 30 will be described. The ECU 30 includes a user authentication unit 31, a vehicle position recognition unit 32, a path selection unit 33, an external environment recognition unit 34, an external environment information generation unit 35, a traveling state recognition unit 36, a vehicle controller 37, and a user interaction unit 38. A part of the functions of the ECU 30 described below may be executed in a server or the like that can communicate with the vehicle.

The user authentication unit 31 authenticates each individual user of the vehicle. The user authentication unit 31 authenticates each individual user through the HMI 25 using a well-known technology (for example, voiceprint authentication and facial image authentication). The vehicle control device 102 does not need to include the user authentication unit 31 when the target of awarding the incentive point is fixedly set as the vehicle or the owner of the vehicle.

The vehicle position recognition unit 32 recognizes the position of the vehicle on the map based on the position information of the GPS receiver 21 and the map information in the vehicle-side map database 24. The vehicle position recognition unit 32 uses the detection result of the external sensor 22 and the position information of a fixed obstacle such as a power pole included in the map information in the vehicle-side map database 24 to recognize the position of the vehicle using the simultaneous localization and mapping (SLAM) technology. The vehicle position recognition unit 32 may recognize the position of the vehicle on the map using other well-known techniques.

The path selection unit 33 presents a traveling path of the vehicle to the user through the HMI 25 when a destination of the vehicle is set. The destination of the vehicle may be set by the user or may be automatically set by the vehicle control device 102 using a well-known technology.

The path selection unit 33 presents the traveling path of the vehicle to the user using a well-known technology based on the map information and the position of the vehicle on the map recognized by the vehicle position recognition unit 32. When a plurality of paths to the destination is present, the path selection unit 33 causes the user to select a path by presenting the paths. The path selection unit 33 sets the path selected by the user as the traveling path of the vehicle in accordance with a response of the user. The path selection unit 33 determines whether or not the vehicle arrives at the destination based on the map information and the position of the vehicle on the map recognized by the vehicle position recognition unit 32. When the path selection unit 33 determines that the vehicle arrives at the destination, the path selection unit 33 cancels the setting of the path.

The external environment recognition unit 34 recognizes the external environment around the vehicle based on the detection result of the external sensor 22. The external environment includes the position of the white line on the road traveled by the vehicle, the shape of the road, the width of the road, and a situation of an obstacle (a situation of a moving obstacle such as another vehicle, a bicycle, and a pedestrian, or a fixed obstacle such as a power pole, a guardrail, and a building, or the like). The external environment is not limited to the environment on the road and may include the environment in the whole detection range of the external sensor 22. The external environment recognition unit 34 recognizes the external environment using a well-known technique based on the captured image of the camera and the obstacle information of the radar sensor.

The external environment information generation unit 35 generates the external environment information based on the position of the vehicle on the map recognized by the vehicle position recognition unit 32 and the external environment around the vehicle recognized by the external environment recognition unit 34. The external environment information includes information of the external environment that is associated with the position of the vehicle on the map. The external environment information may include the reliability of the external sensor 22 at the time of detecting the external environment and/or the reliability of the recognized position of the vehicle. The external environment information generation unit 35 may recognize each area set in advance on the map by communicating with the map information update server 101, and generate the external environment information per area.

The traveling state recognition unit 36 recognizes the traveling state of the vehicle based on the detection result of the internal sensor 23. The traveling state includes the vehicle speed of the vehicle, the acceleration of the vehicle, and the yaw rate of the vehicle. Specifically, the traveling state recognition unit 36 recognizes the vehicle speed of the vehicle based on the vehicle speed information of the vehicle speed sensor. The traveling state recognition unit 36 recognizes the acceleration of the vehicle based on the vehicle speed information of the acceleration sensor. The traveling state recognition unit 36 recognizes the direction of the vehicle based on the yaw rate information of the yaw rate sensor.

The vehicle controller 37 controls traveling of the vehicle by transmitting a control signal to the actuator 26. When autonomous driving control is requested for the vehicle, the vehicle controller 37 executes the autonomous driving control of the vehicle based on the map information in the vehicle-side map database 24, the position of the vehicle on the map recognized by the vehicle position recognition unit 32, the path set in the path selection unit 33, the external environment of the vehicle recognized by the external environment recognition unit 34, and the traveling state of the vehicle recognized by the traveling state recognition unit 36. The vehicle controller 37 uses a well-known technology to execute the autonomous driving control for causing the vehicle to travel without needing a driving operation of the user.

The vehicle controller 37 may perform driving assistance control of the vehicle. The driving assistance control can include lane keeping assist (LKA) and/or adaptive cruise control (ACC). The driving assistance control enables control corresponding to autonomous driving level 1 or autonomous driving level 2. When the path is set in the path selection unit 33, the vehicle controller 37 may execute path guidance control for guiding the user along the path through the HMI 25.

When the response of the user to change the lane is input into the user interaction unit 38 described below, the vehicle controller 37 may have the function of automatically executing a lane change even when the vehicle is being manually driven (or under the driving assistance control).

The user interaction unit 38 exchanges various types of information with the user of the vehicle through the HMI 25. The user interaction unit 38 may have the function of setting the target of awarding the incentive point. The target of awarding the incentive point can be selected from vehicles or users of a vehicle authenticated by the user authentication unit 31. The target of awarding the incentive point may be fixedly set as either the user of the vehicle or the vehicle.

The user interaction unit 38 presents incentive point information related to the incentive point in each area when requested by the user. The user interaction unit 38 acquires and presents the incentive point information by communicating with the map information update server 101.

The incentive point information is information about the incentive point that is acquired by transmitting the external environment information in each area to the map information update server 101. The incentive point information can include information about the first additional incentive point and/or the second additional incentive point.

The user interaction unit 38 acquires the incentive point information by communicating with the map information update server 101 at the time of path selection in which the user selects the traveling path of the vehicle from the paths in the path selection unit 33. The user interaction unit 38 presents the incentive point information in each path to the user. The incentive point information in each path is information related to the incentive point that is acquired by transmitting, to the map information update server 101, the external environment information which is acquired by the vehicle traveling along each path. Path selection may be selection of a path that the vehicle automatically travels under the autonomous driving control, or may be selection of a path along which the user (for example, the driver) is guided while manually driving the vehicle.

For example, when the vehicle arrives at the destination set in advance, the user interaction unit 38 presents, to the user, the incentive point information that is acquired by transmitting the external environment information which is acquired before the vehicle arrives at the destination. In such a case, the user interaction unit 38 asks the user whether or not to transmit the external environment information to the map information update server 101. The user interaction unit 38 asks the user by displaying an image or outputting audio through the HMI 25. The user interaction unit 38 recognizes the response of the user through the HMI 25 by recognizing the voice of the user or when an input device such as the touch panel is operated by the user.

When the user responds to transmit the external environment information to the map information update server 101, the user interaction unit 38 transmits the external environment information to the map information update server 101 through the vehicle-side communication unit 27. When the user responds to not transmit the external environment information to the map information update server 101, the user interaction unit 38 does not transmit the external environment information to the map information update server 101.

When the external environment information is transmitted to the map information update server 101 from the vehicle, the incentive point awarding unit 13 of the map information update server 101 awards the user or the vehicle the incentive point that is set in advance in accordance with the map freshness of each area corresponding to the external environment information.

At the time of path selection, the user interaction unit 38 acquires map freshness information related to the map freshness of each area along each path by communicating with the map information update server 101. The user interaction unit 38 determines whether or not a target path that is the path passing through areas having map freshness lower than or equal to a map freshness threshold is provided as a selectable option at the time of path selection. The map freshness threshold is a threshold that is set in advance.

When the user interaction unit 38 determines that the target path is provided as a selectable option, the user interaction unit 38 informs the user that the first additional incentive point is awarded by transmitting the external environment information acquired by the vehicle traveling along the target path to the map information update server 101. The user interaction unit 38 presents the incentive point information including the first additional incentive point to the user. The number of target paths does not need to be one. A plurality of target paths may be provided as selectable options.

When the external environment information of the target path acquired by the vehicle traveling along the target path selected by the user is transmitted to the map information update server 101 from the vehicle, the incentive point awarding unit 13 of the map information update server 101 awards the user or the vehicle the incentive point and the first additional incentive point. For example, the external environment information of the target path may be the external environment information that is acquired by the vehicle traveling a certain or greater proportion (for example, 95% or more) of the target path.

FIG. 2A is a diagram illustrating one example of information that is presented to the user at the time of path selection. FIG. 2A illustrates a vehicle M and paths A, B to the destination on the map. As illustrated in FIG. 2A, the predicted needed time period for the path A (five minutes) is shorter than the predicted needed time period for the path B (eight minutes), but the map freshness of each area through which the path A passes (high) is higher than the map freshness of each area through which the path B passes (low). Thus, the incentive point for the path B (80 P; P is an abbreviation for point) is set to be higher than the incentive point for the path A (30 P) in the map information update server 101.

In FIG. 2A, it is assumed that the map freshness of each area through which the path B passes is lower than the map freshness threshold. In such a case, the path B is the target of the first additional incentive point (+20 P). For example, the user interaction unit 38 presents the predicted needed time period, the map freshness information, and the incentive point information for each path to the user as illustrated in FIG. 2A. Accordingly, the user is motivated to select the path B that has a longer predicted needed time period but has low map freshness and a high incentive point. When the user interaction unit 38 recognizes the response of the user related to path selection, the path selection unit 33 sets the path in accordance with the response of the user.

When the vehicle is traveling, the user interaction unit 38 communicates with the map information update server 101 to acquire the map freshness information of each area through which a traveling lane of the vehicle passes, and the map freshness information of each area through which an adjacent lane adjacent to the traveling lane passes. The user interaction unit 38 determines whether or not the map freshness of each area through which the adjacent lane passes is lower than the map freshness of each area through which the traveling lane passes. For example, when the path is set, the traveling lane in the determination refers to the range of the traveling lane of the vehicle that overlaps with the path. The traveling lane may refer to the range of the traveling lane of the vehicle that is within a certain distance from the position of the vehicle in the traveling direction of the vehicle. The adjacent lane refers to a range that is adjacent to the traveling lane.

When the user interaction unit 38 determines that the map freshness of each area through which the adjacent lane passes is lower than the map freshness of each area through which the traveling lane passes, the user interaction unit 38 informs the user that the second additional incentive point is awarded by transmitting the external environment information acquired by the vehicle traveling on the adjacent lane to the map information update server 101. The user interaction unit 38 presents the incentive point information including the second additional incentive point to the user.

When the external environment information of the adjacent lane is transmitted to the map information update server 101 from the vehicle by the vehicle traveling on the adjacent lane after the vehicle changes the lane, the incentive point awarding unit 13 of the map information update server 101 awards the user or the vehicle the incentive point and the second additional incentive point. The external environment information of the adjacent lane may be the external environment information that is acquired by the vehicle traveling on the adjacent lane a certain or longer distance (or a certain or greater proportion of the adjacent lane).

FIG. 2B is a diagram illustrating one example of information that is presented to the user at the time of suggesting a lane change. As illustrated in FIG. 2B, the predicted needed time period is increased when the vehicle changes the lane to the adjacent lane. Meanwhile, the map freshness of each area through which the adjacent lane passes is low. Thus, the incentive point is increased by 20 P from when the vehicle continues traveling on the current traveling lane. Since the lane change is needed, the second additional incentive point (+10 P) is applied.

The user interaction unit 38 presents a change in predicted needed time period due to the lane change, the map freshness information of the adjacent lane, and the incentive point information of the adjacent lane to the user as illustrated in FIG. 2B. Accordingly, the user is motivated to change the lane to the adjacent lane that has an increased predicted needed time period but has low map freshness and provides the incentive point. The lane change may be automatically performed in accordance with the response of the user or may be manually performed by the user. The adjacent lane is not limited to a lane that is immediately adjacent to the traveling lane. The adjacent lane may refer to a parallel lane (a lane in the same direction as the traveling lane) that is at a distance corresponding to one lane or a plurality of lanes from the traveling lane in a road having three or more lanes on a single side.

The user interaction unit 38 sets automatic transmission for automatically transmitting the external environment information to the map information update server 101 when requested by the user. When automatic transmission is set, the user interaction unit 38 automatically transmits the external environment information generated by the external environment information generation unit 35 to the map information update server 101. The user interaction unit 38 informs the user that the third additional incentive point is awarded when the external environment information is automatically transmitted to the map information update server 101 by setting automatic transmission.

When the external environment information is automatically transmitted to the map information update server 101 by setting automatic transmission, the incentive point awarding unit 13 of the map information update server 101 awards the user or the vehicle the third additional incentive point.

Processes of Map Information Update System

Hereinafter, processes of the map information update system 100 according to the present embodiment will be described with reference to the drawings.

Map Information Update Process

Figure 3B:
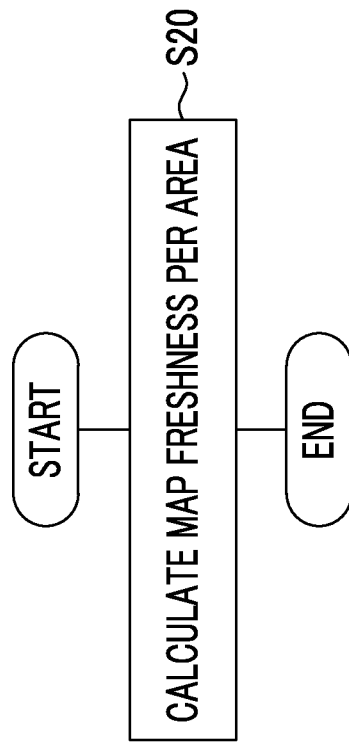
FIG. 3B is a flowchart illustrating a map freshness calculation process.
Figure 3A:
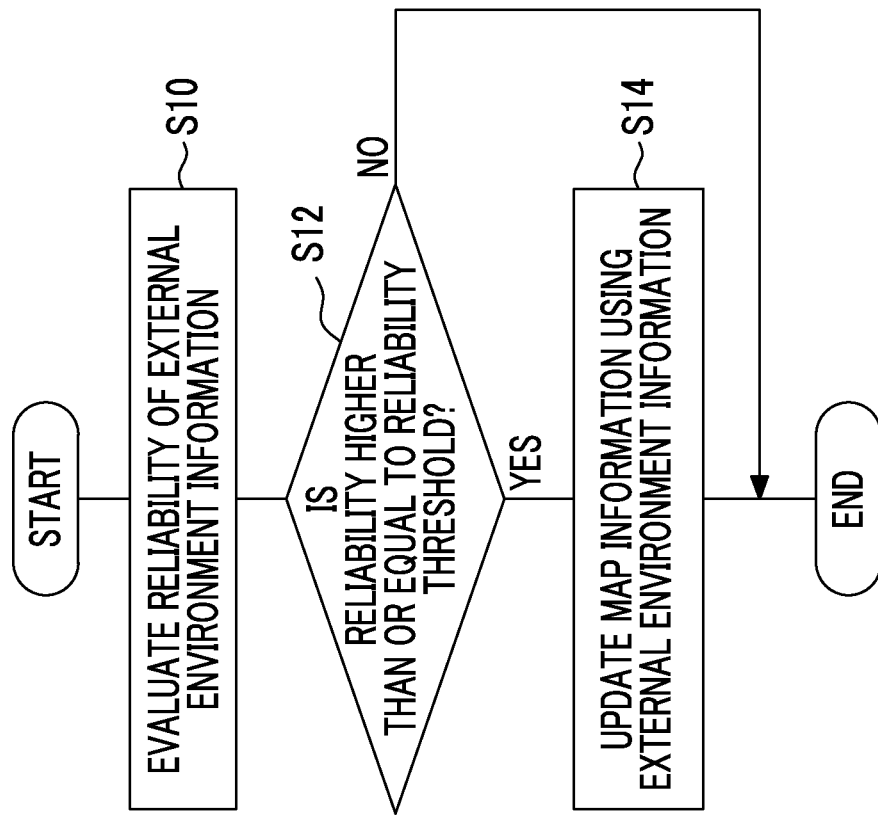
FIG. 3A is a flowchart illustrating a map information update process.

FIG. 3A is a flowchart illustrating a map information update process. The flowchart illustrated in FIG. 3A is executed when the map information update server 101 acquires the external environment information from the vehicle.

As illustrated in FIG. 3A, in S10, the reliability evaluation unit 14 of the map information update server 101 evaluates the reliability of the external environment information. When, for example, information of the white line on the road is not included in the external environment information, the reliability evaluation unit 14 evaluates the reliability of the external environment information as a lower value than when information of the white line is included in the external environment information.

In S12, the map information update unit 15 of the map information update server 101 determines whether or not the reliability of the external environment information is higher than or equal to the reliability threshold. The map information update server 101 finishes the current process when the map information update unit 15 determines that the reliability of the external environment information is not higher than or equal to the reliability threshold (S12: NO). The map information update server 101 transitions to S14 when the map information update unit 15 determines that the reliability of the external environment information is higher than or equal to the reliability threshold (S12: YES).

In S14, the map information update server 101 updates the map information using the external environment information having reliability higher than or equal to the reliability threshold. The map information update unit 15 updates the map information based on the external environment information using a well-known technology. Then, the map information update server 101 finishes the current process.

Map Freshness Calculation Process

FIG. 3B is a flowchart illustrating a map freshness calculation process. The process illustrated in FIG. 3B is executed at all times.

As illustrated in FIG. 3B, in S20, the map freshness calculation unit 12 of the map information update server 101 calculates the map freshness per area that is set on the map information. The map freshness calculation unit 12 calculates the map freshness in accordance with an elapsed time period from the update of the map information in each area. Then, the map information update server 101 finishes the current process.

Information Presentation Process at Time of Path Selection

Figure 4A:
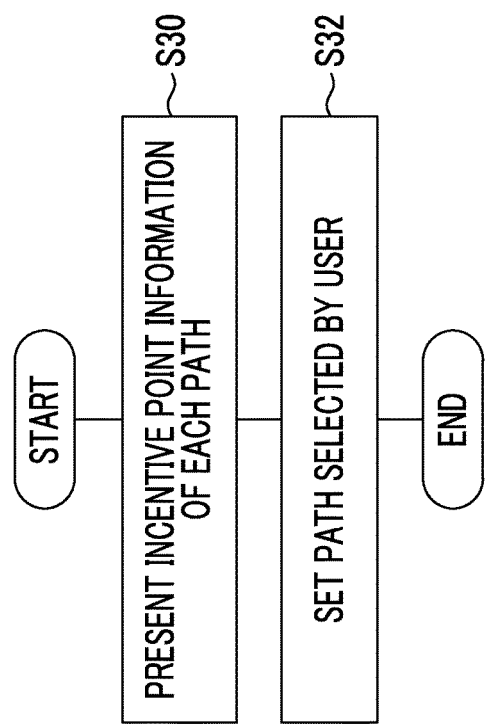
FIG. 4A is a flowchart illustrating an information presentation process at the time of path selection.

FIG. 4A is a flowchart illustrating an information presentation process at the time of path selection. The flowchart illustrated in FIG. 4A is executed when the user selects the path.

As illustrated in FIG. 4A, in S30, the user interaction unit 38 of the ECU 30 of the vehicle control device 102 presents the incentive point information of each path. The user interaction unit 38 presents the incentive point information of each path acquired by communicating with the map information update server 101 to the user through the HMI 25. The user interaction unit 38 may present the predicted needed time period and the map freshness information to the user along with the incentive point information.

In S32, the path selection unit 33 of the ECU 30 sets the path selected by the user. The path selection unit 33 sets the path selected by the user as the traveling path of the vehicle. Then, the ECU 30 finishes the current process.

Incentive Point Awarding Process

Figure 4B:
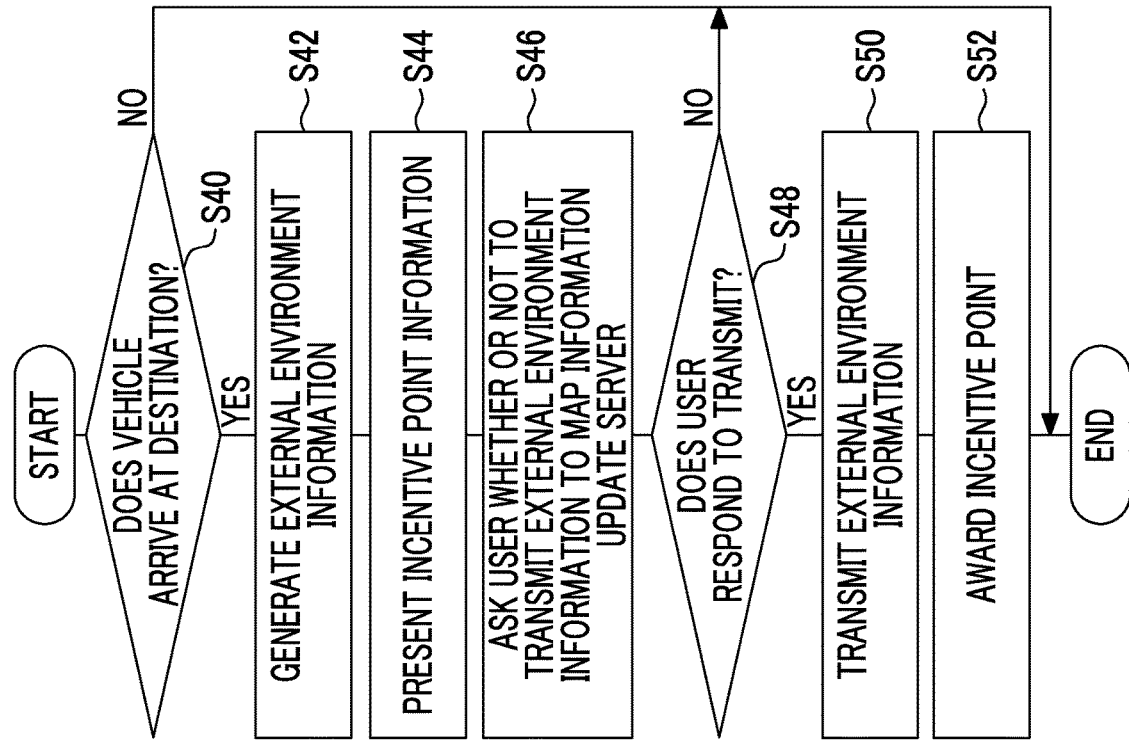
FIG. 4B is a flowchart illustrating an incentive point awarding process.

FIG. 4B is a flowchart illustrating an incentive point awarding process. The flowchart illustrated in FIG. 4B is executed when the path is set. When the setting of the path is canceled before the vehicle arrives at the destination, the process of the flowchart illustrated in FIG. 4B is finished.

As illustrated in FIG. 4B, in S40, the path selection unit 33 of the ECU 30 of the vehicle control device 102 determines whether or not the vehicle arrives at the destination. The path selection unit 33 determines whether or not the vehicle arrives at the destination based on the map information and the position of the vehicle on the map recognized by the vehicle position recognition unit 32. When the path selection unit 33 determines that the vehicle does not arrive at the destination (S40: NO), the ECU 30 finishes the current process. Then, the ECU 30 starts processing again from S40 after elapse of a certain time period. When the path selection unit 33 determines that the vehicle arrives at the destination (S40: YES), the ECU 30 transitions to S42.

In S42, the external environment information generation unit 35 of the ECU 30 generates the external environment information. The external environment information generation unit 35 generates the external environment information by associating the position of the vehicle on the map with the external environment around the vehicle that is recognized by the external environment recognition unit 34 before the vehicle arrives at the destination.

In S44, the user interaction unit 38 of the ECU 30 presents the incentive point information to the user. The user interaction unit 38 presents the incentive point information in the external environment information generated by the external environment information generation unit 35 to the user.

In S46, the user interaction unit 38 of the ECU 30 asks the user whether or not to transmit the external environment information to the map information update server 101. The user interaction unit 38 asks the user by displaying an image or outputting audio through the HMI 25.

In S48, the user interaction unit 38 of the ECU 30 determines whether or not the user responds to transmit the external environment information to the map information update server 101. When the user responds to not transmit the external environment information to the map information update server 101 (S48: NO), the ECU 30 finishes the current process. When the user responds to transmit the external environment information to the map information update server 101 (S48: YES), the ECU 30 transitions to S50.

In S50, the user interaction unit 38 of the ECU 30 transmits the external environment information to the map information update server 101. The user interaction unit 38 transmits the external environment information to the map information update server 101 through the vehicle-side communication unit 27.

In S52, the incentive point awarding unit 13 of the map information update server 101 awards the user or the vehicle the incentive point. The incentive point awarding unit 13 awards the user or the vehicle the incentive point that is set in advance in accordance with the map freshness of each area corresponding to the external environment information transmitted from the vehicle control device 102. Then, the ECU 30 and the map information update server 101 finish the current process.

Target Path Selection Process

FIG. 5A is a flowchart illustrating a target path selection process. The flowchart illustrated in FIG. 5A is executed when the user selects the path.

As illustrated in FIG. 5A, in S60, the user interaction unit 38 of the ECU 30 of the vehicle control device 102 determines whether or not the target path that is the path passing through each area having map freshness lower than or equal to the map freshness threshold is provided as a selectable option. The user interaction unit 38 performs the determination based on the map freshness information that is acquired by communicating with the map information update server 101 and is related to the map freshness of each area along each path. When the user interaction unit 38 determines that the target path is not provided as a selectable option (S60: NO), the ECU 30 finishes the current process. When the user interaction unit 38 determines that the target path is provided as a selectable option (S60: YES), the ECU 30 transitions to S62.

In S62, the user interaction unit 38 of the ECU 30 presents the incentive point information to the user. The user interaction unit 38 presents the incentive point information including the first additional incentive point to the user.

In S64, the user interaction unit 38 of the ECU 30 determines whether or not the user selects the target path. When the user does not select the target path (S64: NO), the ECU 30 finishes the current process. When the user selects the target path (S64: YES), the ECU 30 transitions to S66.

In S66, the path selection unit 33 of the ECU 30 sets the path. The path selection unit 33 sets the target path as the traveling path of the vehicle. Then, the ECU 30 transitions to a first additional incentive point awarding process.

First Additional Incentive Point Awarding Process

FIG. 5B is a flowchart illustrating the first additional incentive point awarding process. When the setting of the path is canceled before the vehicle arrives at the destination, the process of the flowchart illustrated in FIG. 5B is finished.

As illustrated in FIG. 5B, in S70, the incentive point awarding unit 13 of the map information update server 101 determines whether or not the external environment information of the target path is transmitted to the map information update server 101. When the incentive point awarding unit 13 determines that the external environment information of the target path is not transmitted to the map information update server 101 (S70: NO), the map information update server 101 starts processing again from S70 after elapse of a certain time period. When the incentive point awarding unit 13 determines that the external environment information of the target path is transmitted to the map information update server 101 (S70: YES), the map information update server 101 transitions to S72.

In S72, the incentive point awarding unit 13 of the map information update server 101 awards the first additional incentive point. The incentive point awarding unit 13 awards the user or the vehicle the first additional incentive point. In addition to the first additional incentive point, the incentive point awarding unit 13 awards the user or the vehicle the incentive point that is set in advance in accordance with the map freshness of each area corresponding to the external environment information of the target path. Then, the map information update server 101 finishes the current process.

Adjacent Lane Determination Process

Figure 6A:
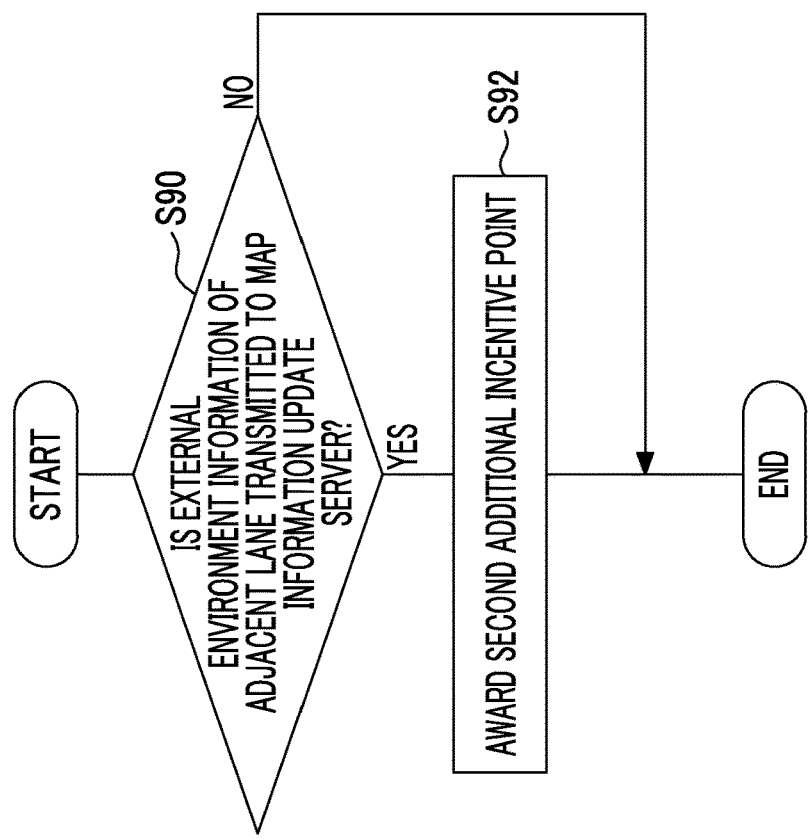
FIG. 6A is a flowchart illustrating an adjacent lane determination process.

FIG. 6A is a flowchart illustrating an adjacent lane determination process. The flowchart illustrated in FIG. 6A is executed when the vehicle is traveling.

As illustrated in FIG. 6A, in S80, the user interaction unit 38 of the ECU 30 of the vehicle control device 102 determines whether or not the map freshness of each area through which the adjacent lane passes is lower than the map freshness of each area through which the traveling lane passes. The user interaction unit 38 performs the determination based on the map freshness information that is acquired by communicating with the map information update server 101.

When the user interaction unit 38 determines that the map freshness of each area through which the adjacent lane passes is not lower than the map freshness of each area through which the traveling lane passes (S80: NO), the ECU 30 finishes the current process. Then, the ECU 30 starts processing S80 again after elapse of a certain time period. A NO determination is made in S80 when there is no adjacent lane. When the user interaction unit 38 determines that the map freshness of each area through which the adjacent lane passes is lower than the map freshness of each area through which the traveling lane passes (S80: YES), the ECU 30 transitions to S82.

In S82, the user interaction unit 38 of the ECU 30 presents the incentive point information to the user. The user interaction unit 38 presents the incentive point information including the second additional incentive point to the user. Then, the ECU 30 transitions to a second additional incentive point awarding process.

Second Additional Incentive Point Awarding Process

Figure 6B:
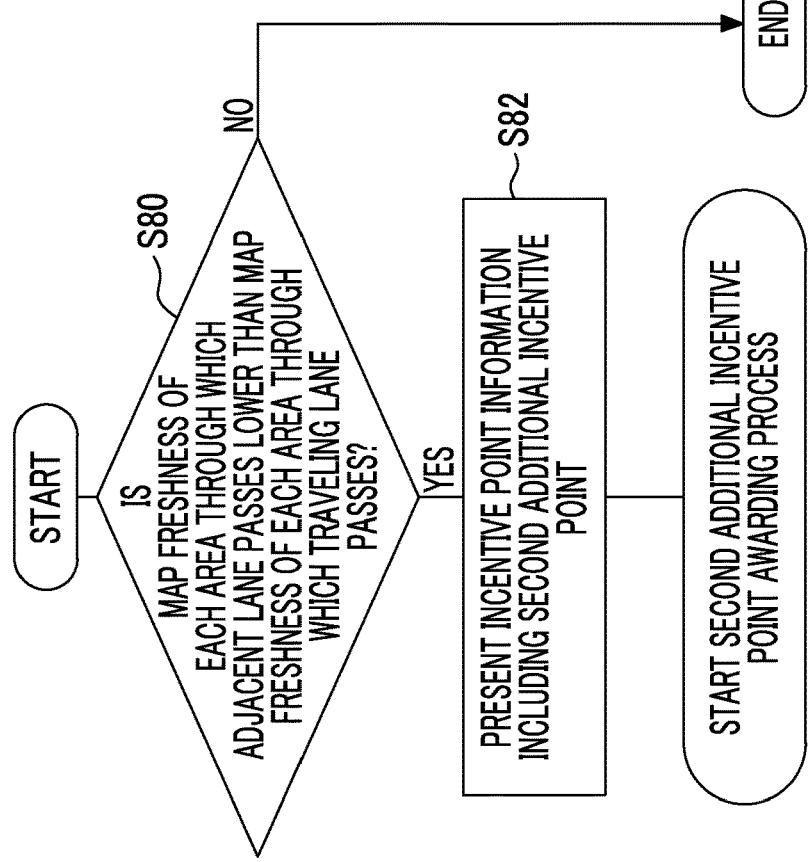
FIG. 6B is a flowchart illustrating a second additional incentive point awarding process.

FIG. 6B is a flowchart illustrating the second additional incentive point awarding process. The process of the flowchart illustrated in FIG. 6B may be finished when a determination is made that the vehicle is not traveling in the adjacent lane during elapse of a certain time period.

As illustrated in FIG. 6B, in S90, the incentive point awarding unit 13 of the map information update server 101 determines whether or not the external environment information of the adjacent lane is transmitted to the map information update server 101. When the incentive point awarding unit 13 determines that the external environment information of the adjacent lane is not transmitted to the map information update server 101 (S90: NO), the map information update server 101 starts processing S90 again after elapse of a certain time period. When the incentive point awarding unit 13 determines that the external environment information of the adjacent lane is transmitted to the map information update server 101 (S90: YES), the map information update server 101 transitions to S92.

In S92, the incentive point awarding unit 13 of the map information update server 101 awards the second additional incentive point. The incentive point awarding unit 13 awards the user or the vehicle the second additional incentive point. In addition to the second additional incentive point, the incentive point awarding unit 13 awards the user or the vehicle the incentive point that is set in advance in accordance with the map freshness of each area corresponding to the external environment information of the target path. Then, the map information update server 101 finishes the current process.

Effects of Map Information Update System

In the map information update system 100 according to the present embodiment described heretofore, when the external environment information is transmitted to the map information update server from the vehicle, the user of the vehicle or the vehicle is awarded the incentive point that is set in advance in accordance with the map freshness calculated per area corresponding to the external environment information. Accordingly, the map information update system 100 can award the user of the vehicle or the vehicle the incentive point that corresponds to the usefulness of information transmitted to the map information update server. The map information update system 100 can improve the convenience of use for the user by presenting the map freshness information related to the map freshness of each area or the incentive point information related to the incentive point of each area to the user.

The map information update system 100 asks the user whether or not to transmit the external environment information to the map information update server from the vehicle. When the user responds to not transmit the external environment information to the map information update server, the external environment information is not transmitted to the map information update server. Thus, the convenience of use for the user can be improved.

The map information update system 100 presents the map freshness information or the incentive point information in each path to the user at the time of path selection. Thus, the user can be motivated to select the path from which the user wants to acquire the external environment information from the viewpoint of updating the map information. The map information update system 100, by awarding the first additional incentive point, can motivate the user to select the target path passing through each area having map freshness lower than or equal to the map freshness threshold. Thus, it is advantageous for both the user and a system operator to transmit the external environment information of each area having map freshness lower than or equal to the map freshness threshold to the map information update server.

The map information update system 100, by awarding the second additional incentive point, can motivate the user to change the lane to the adjacent lane that passes through each area having lower map freshness, when the map freshness of each area through which the adjacent lane adjacent to the traveling lane passes is lower than the map freshness of each area through which the traveling lane traveled by the vehicle passes. Thus, it is advantageous for both the user and the system operator to transmit the external environment information of each area having lower map freshness to the map information update server.

The map information update system 100 automatically transmits the external environment information generated by the external environment information generation unit to the map information update server when the user sets automatic transmission to automatically transmit the external environment information of the vehicle to the map information update server. Thus, the user does not need to respond each time for transmission of the external environment information, and the convenience of use for the user can be improved. The map information update system 100, by awarding the third additional incentive point, can motivate the user to set automatic transmission of the external environment information of the vehicle, and the map information update server can stably acquire the external environment information. Thus, it is advantageous for both the user and the system operator.

While an exemplary embodiment of the present disclosure is described heretofore, the present disclosure is not limited to the embodiment. The present disclosure can be embodied in various forms that are achieved by carrying out various changes and improvements to the embodiment based on the knowledge of those skilled in the art.

The vehicle control device 102 of the map information update system 100 does not need to control traveling of the vehicle. In such a case, the ECU 30 of the vehicle control device 102 does not need to include the traveling state recognition unit 36 and the vehicle controller 37. The vehicle control device 102 does not need to present the incentive point information or the map freshness information at the time of path selection. The vehicle control device 102 may present the incentive point information or the map freshness information when the vehicle arrives at the destination, or when requested by the user. The user interaction unit 38 may present merely the map freshness information instead of the incentive point information to the user. The incentive point may be awarded to both the user and the vehicle.

The vehicle control device 102 may not have the function of asking the user. That is, the vehicle control device 102 may automatically transmit the external environment information to the map information update server 101 at all times. In such a case, the map information update server 101 automatically awards the user or the vehicle the incentive point. The vehicle control device 102 presents the awarded incentive point information to the user.

The map information update system 100 does not need to award the first additional incentive point, the second additional incentive point, and the third additional incentive point. The map information update system 100 may be configured to award any one or any two of the first additional incentive point, the second additional incentive point, and the third additional incentive point, or may be configured to not award all of the first additional incentive point, the second additional incentive point, and the third additional incentive point.

The map information update system 100 may not have the function of automatic transmission for automatically transmitting the external environment information to the map information update server 101. The map information update server 101 does not need to include the reliability evaluation unit 14 that evaluates the reliability of the external environment information.

As a modification example of the map information update system, it is considered that when the user selects the path at the time of user's path selection during or at the start of the autonomous driving control of the vehicle, the user or the vehicle is first awarded the incentive point corresponding to the external environment information that will be acquired by the vehicle traveling along the path selected by the user. That is, it is considered that when there is high likelihood of collecting the external environment information by the vehicle traveling along the path selected by the user under the autonomous driving control, the incentive point may be awarded before the external environment information is transmitted to the map information update server 101. For example, in S32 in FIG. 4A, when the path selected by the user is set as the traveling path of the vehicle under the autonomous driving control, the user or the vehicle is awarded the incentive point in each area through which the path passes. The first additional incentive point may also be awarded first to the user or the vehicle in the same manner.

As a modification example of the map information update system, when a determination is made that the map freshness of each area through which the adjacent lane passes is lower than the map freshness of each area through which the traveling lane passes, and there is high likelihood of collecting the external environment information by the vehicle traveling on the adjacent lane under the autonomous driving control after the user chooses to change the lane, the second additional incentive point may be awarded to the user or the vehicle when the user chooses to change the lane. The third additional incentive point may be awarded to the user or the vehicle when automatic transmission is set.

What is claimed is:

1. A map information update system comprising:
   a map database configured to store map information;
   a map information update server configured to update the map information based on external environment information which is acquired by communicating with a vehicle;
   a vehicle position recognition unit configured to recognize a position of the vehicle on a map;
   an external environment information generation unit configured to generate the external environment information related to an external environment of the vehicle in association with the position of the vehicle on the map based on the position of the vehicle on the map and a detection result of an external sensor which is mounted in the vehicle;
   a map freshness calculation unit configured to calculate map freshness per area which is set in advance on the map information;
   an incentive point awarding unit configured to award a user of the vehicle or the vehicle an incentive point which is set in advance in accordance with the map freshness of the area corresponding to the external environment information, when the external environment information is transmitted to the map information update server from the vehicle; and a user interaction unit configured to present map freshness information related to the map freshness of the area or incentive point information related to the incentive point of the area to the user.

2. The map information update system according to claim 1, wherein the user interaction unit asks the user whether or not to transmit the external environment information to the map information update server, and controls the external environment information to be transmitted to the map information update server when the user responds to transmit the external environment information to the map information update server.

3. The map information update system according to claim 1, further comprising a path selection unit configured to cause the user to select the path when a plurality of paths to be traveled by the vehicle is present,
wherein the user interaction unit presents the map freshness information in the paths or the incentive point information in the paths to the user at a time of path selection by the user.

4. The map information update system according to claim 3, wherein:
when a target path that passes through the area having the map freshness lower than or equal to a map freshness threshold is included in the paths at the time of path selection by the user, the user interaction unit informs the user that a first additional incentive point is awarded by transmitting the external environment information acquired by the vehicle traveling along the target path to the map information update server; and
the incentive point awarding unit awards the user or the vehicle the first additional incentive point when the external environment information of the target path acquired by the vehicle traveling along the target path selected by the user is transmitted to the map information update server.

5. The map information update system according to claim 1, wherein:
when the map freshness of the area through which an adjacent lane that is adjacent to a traveling lane traveled by the vehicle passes is lower than the map freshness of the area through which the traveling lane passes, the user interaction unit informs the user that a second additional incentive point is awarded by transmitting the external environment information acquired by the vehicle traveling on the adjacent lane to the map information update server; and
the incentive point awarding unit awards the user or the vehicle the second additional incentive point when the external environment information of the adjacent lane acquired by the vehicle changing the lane is transmitted to the map information update server.

6. The map information update system according to claim 1, wherein when the user sets automatic transmission to automatically transmit the external environment information of the vehicle to the map information update server, the user interaction unit automatically transmits the external environment information generated by the external environment information generation unit to the map information update server.

7. The map information update system according to claim 6, wherein:
the user interaction unit informs the user that a third additional incentive point is awarded when the external environment information is automatically transmitted to the map information update server by setting the automatic transmission; and
the incentive point awarding unit awards the user or the vehicle the third additional incentive point when the external environment information is automatically transmitted to the map information update server by setting the automatic transmission.

8. The map information update system according to claim 1, wherein:
the map information update server includes a reliability evaluation unit that evaluates reliability of the external environment information; and
the map information update server updates the map information using the external environment information that has the reliability higher than or equal to a reliability threshold.

* * * * *